Aug. 23, 1932.   B. D. KUNKLE ET AL   1,873,208

SHOCK ABSORBER

Filed Oct. 19, 1931

Inventors
BAYARD D. KUNKLE
AND
CARL H. KINDL
By Spencer, Hardman and Fehr
Attorneys Patented Aug. 23, 1932

1,873,208

UNITED STATES PATENT OFFICE

BAYARD D. KUNKLE AND CARL H. KINDL, OF DAYTON, OHIO, ASSIGNORS TO DELCO PRODUCTS CORPORATION, OF DAYTON, OHIO, A CORPORATION OF DELAWARE

SHOCK ABSORBER

Application filed October 19, 1931. Serial No. 569,750.

This invention relates to improvements in shock absorbers and particularly to the fluid displacement member in hydraulic shock absorbers.

It is among the objects of the present invention to provide a two piece fluid displacement member with a resilient connection which yieldably urges the two pieces of the displacement member into engagement with an actuator.

Another object of the present invention is to provide a fluid displacement member for a hydraulic shock absorber, of simple structure and design capable of being produced commercially at a minimum expense of material and labor.

Further objects and advantages of the present invention will be apparent from the following description, reference being had to the accompanying drawing wherein a preferred embodiment of one form of the present invention is clearly shown.

Figure 1:
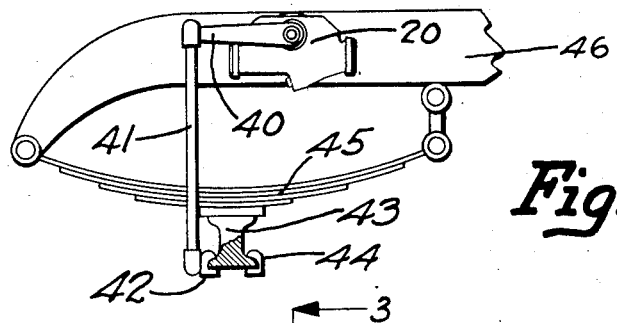
Fig. 1 is a fragmentary side view of a vehicle chassis having a shock absorber attached thereto embodying the present invention.

Referring to the drawing the shock absorber is shown comprising a casing 20 which provides a fluid reservoir 21 and a cylinder 22. The ends of the cylinder are provided with cylinder head caps 23 and 24.

A fluid displacement member is provided in the cylinder 22 said displacement member comprising separate piston head portions 25 and 26. The piston head portion 25 forms the compression chamber 27 at one end of the cylinder and at the other end of the cylinder the compression chamber 28 is formed by the piston head portion 26.

Figure 2:
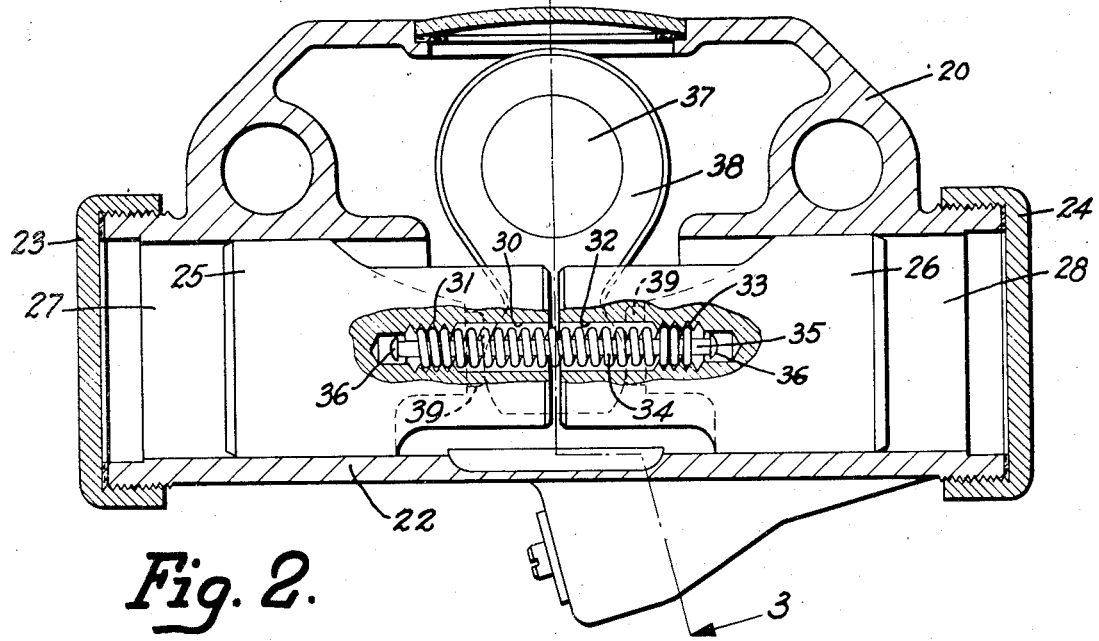
Fig. 2 is a longitudinal sectional view of the shock absorber, parts thereof being shown in elevation for the sake of clearness.
Figure 3:
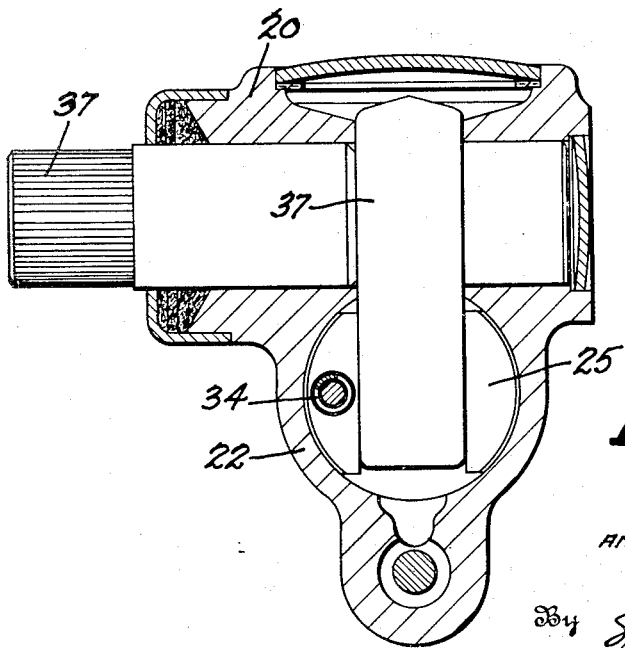
Fig. 3 is a transverse sectional view taken along the line 3—3 of Fig. 2.

As shown in Fig. 2 the end of the piston head portion 25, adjacent the piston head portion 26, is provided with a recess 30 which has a threaded portion 31. A similar recess 32 is provided in the end of the piston head portion 26 adjacent the piston head portion 25, said recess also having an interior threaded portion 33. A spring 34, helically wound so that the convolutions thereof are substantially of the same pitch as the threads of portions 31 and 33 has one end extending into recess 30, a certain number of convolutions of this end of spring 34 being threaded into the threaded portion 31 of said recess 30 to secure the spring to piston head 25. A certain number of convolutions at the opposite end of the spring threadedly engages the threaded portion 33 in recess 32 whereby the other end of the spring is attached to piston head portion 26. When threaded into the respective piston head portions 25 and 26 the spring 34 is under tension thus said spring draws the two piston head portions 25 and 26 toward each other.

A pin 35 extends through the spring 34, each end of the pin being provided with a head 36 spaced somewhat from the adjacent end convolution of the spring.

In the casing 20 a shaft 37 is transversely journalled said shaft supporting rocker arm 38 inside the casing 20. The free end of this rocker arm extends into a recess provided by cut away portions in the respective piston heads 25 and 26. In the cut away portion of each piston head there is provided a wear piece 39, which are urged into engagement with the free end of rocker arm 38 by the spring 34 pulling the piston head portions 25 and 26 toward each other.

One end of shaft 37 extends outside the casing and has the shock absorber operating arm 40 attached thereto the free end of which is swivelly secured to one end of a link 41. The other end of this link is swivelly attached to a bracket 42 which is secured to the vehicle axle 43 by a clamping member 44. The axle 43 supports the vehicle spring 45 which in turn supports the vehicle frame 46 to which the shock absorber casing is attached as shown in Fig. 1.

Movements of the axle 43 toward or away from the frame 46 in response to compression or rebound movements of the vehicle springs 45 will rotate the arm 40 clockwise or counterclockwise respectively and consequently the rocker arm 38 will be moved in the respective directions. As the arm 38 is moved clockwise it exerts a push upon the wear piece 39 of the piston head portion 25 thereby urging this piston head portion toward the left as regards Fig. 2. The spring 34 being connected with both piston head portions 25 and 26 as has been described, will cause the piston head portion 26 to follow in the path of the piston head portion 25 toward the left as regards Fig. 2. The reverse is true when the arm 38 operates in a counterclockwise direction in which case piston head portion 26 is pushed toward the right as regards Fig. 2, the piston head portion 25 then acting as a follower.

If for any reason the follower piston head portion should stick in the cylinder then spring 34 will be stretched to permit relative movement between the two piston head portions. If the stretching becomes excessive, then the heads 36 of pin 35 will engage their respective end convolutions of the spring thereby preventing further stretching of the spring. A direct pull from one piston head portion to the other will thus be exerted through said pin 35 thereby eliminating the possibility of stretching the spring 34 beyond its elastic limit.

Applicant has provided a simple and inexpensive means for urging the piston head portions toward and against an actuator which means is of an elastic nature permitting relative movements between piston head portions under certain circumstances said relative movement, however, being limited by a positive connection adapted to be brought into effect before the spring is stretched to its elastic limit.

While the form of embodiment of the present invention as herein disclosed constitutes a preferred form, it is to be understood that other forms might be adopted, all coming within the scope of the claims which follow.

What is claimed is as follows:

1. A shock absorber comprising, in combination, a casing providing a cylinder; two pistons in said cylinder; an actuator for said pistons oscillatably supported within said casing; a recess in the end surface of each piston, each recess being interiorly threaded, the recess of one piston aligning with the recess of the other piston; and a coil spring having each end threadedly engaging a recess of a respective piston, said spring yieldably urging the pistons against the actuator.

2. A shock absorber comprising, in combination, a casing providing a cylinder; two pistons in said cylinder; an actuator for said pistons oscillatably supported within said casing; a recess in the end surface of each piston, each recess being interiorly threaded, the recess of one piston aligning with the recess of the other piston; and a helically wound coil spring having a number of its end convolutions threadedly engaging the threaded recesses of the respective pistons, said spring yieldably urging the pistons against the actuator.

3. A shock absorber comprising, in combination, a casing providing a cylinder; two pistons in said cylinder; the adjacent end surfaces of said pistons having a recess both of which form a central chamber between the pistons; an actuator oscillatably carried in the casing and extending into said central chamber; recesses in the said adjacent end surfaces of the pistons, said recesses having screw threads provided therein; and a helically wound spring having each end threadedly secured in a piston recess, said spring yieldably urging the pistons to engage with the actuator.

4. A shock absorber comprising, in combination, a casing providing a cylinder; two pistons in said cylinder; the adjacent end surfaces of said pistons having a recess both of which form a central chamber between the pistons; an actuator oscillatably carried in the casing and extending into said central chamber; recesses in the said adjacent end surfaces of the pistons, said recesses having screw threads of a predetermined pitch provided therein; and a helically wound spring the convolutions of which are wound at substantially the same pitch as the screw threads in the recesses of the pistons with which said spring threadedly engages so that the spring is tensed yieldably to urge the pistons against the actuator.

5. A shock absorber comprising, in combination, a casing providing a cylinder; pistons in said cylinder said pistons having recesses in adjacent end surfaces which recesses are in alignment; screw threads in each of the piston recesses; a piston actuator oscillatably supported within the casing; a spring having its end convolutions threadedly engaging the recesses of the pistons to secure the spring to said pistons; and a pin extending through said spring said pin having head portions spaced from the ends of the spring and of larger transverse dimensions than the inside diameter of the spring.

6. A shock absorber comprising, in combination, a casing providing a cylinder; an actuator oscillatably supported within the casing; pistons in said cylinder one on each side of the actuator, the adjacent ends of the pistons having interiorly threaded recesses; a spring wound helically at substantially the same pitch as the threads in the piston recesses each end of the spring threadedly extending into a piston recess so that said pistons are yieldably secured together and urged against the actuator by said spring; and a pin in said spring, having a head at each end for limiting the stretching distance of said spring.

7. A shock absorber comprising in combination, a casing providing a cylinder; a fluid displacement member in said cylinder comprising two separate portions; an actuator for said fluid displacement member; resilient means connected between the two separate portions of the displacement member normally urging said portions into engagement with the actuator; and means adapted to limit the stretching of said resilient means and to provide a positive connection between said portions of the displacement member.

8. A shock absorber comprising in combination, a casing providing a cylinder; a fluid displacement member in said cylinder comprising two separate portions; an actuator for said fluid displacement member; resilient means connected between the two separate portions of the displacement member normally urging said portions into engagement with the actuator; and a pin connected with said resilient means for preventing it from being stretched beyond its elastic limit.

9. A shock absorber comprising in combination a casing providing a cylinder; a fluid displacement member in said cylinder comprising two separate portions; an actuator for said fluid displacement member; a coil spring connected between the two separate portions of the displacement member; a pin extending through said coil spring and having a head at each end normally spaced from the adjacent convolution of the spring, said pin preventing the spring from being stretched beyond its elastic limit and providing a means for positively connecting said displacement member portions.

In testimony whereof we hereto affix our signatures.

BAYARD D. KUNKLE.
CARL H. KINDL.